United States Patent
Irgang et al.

(10) Patent No.: US 10,364,961 B2
(45) Date of Patent: Jul. 30, 2019

(54) ILLUMINATION DEVICE FOR A VEHICLE

(71) Applicant: Rebo Lighting & Electronics, LLC, Ann Arbor, MI (US)

(72) Inventors: Todd Irgang, Saline, MI (US); Orin Lenz, Canton, MI (US); Jon Beattie, Ann Arbor, MI (US)

(73) Assignee: REBO LIGHTING & ELECTRONICS, LLC, Ann Arbor, MI (US)

(*) Notice: Subject to any disclaimer, the term of this patent is extended or adjusted under 35 U.S.C. 154(b) by 0 days.

(21) Appl. No.: 15/800,004

(22) Filed: Oct. 31, 2017

(65) Prior Publication Data

US 2019/0128503 A1    May 2, 2019

(51) Int. Cl.
| | |
|---|---|
| *B60Q 3/00* | (2017.01) |
| *F21V 5/04* | (2006.01) |
| *B60Q 3/30* | (2017.01) |
| *B60Q 3/50* | (2017.01) |
| *F21V 17/06* | (2006.01) |
| *F21V 5/00* | (2018.01) |
| *F21Y 115/10* | (2016.01) |
| *F21Y 103/10* | (2016.01) |

(52) U.S. Cl.
CPC .............. *F21V 5/045* (2013.01); *B60Q 3/30* (2017.02); *B60Q 3/50* (2017.02); *F21V 5/008* (2013.01); *F21V 17/06* (2013.01); *F21Y 2103/10* (2016.08); *F21Y 2115/10* (2016.08)

(58) Field of Classification Search
CPC . F21V 5/045; F21V 5/008; F21V 5/02; F21V 5/04; F21V 5/048; F21V 17/06; B60Q 3/50; B60Q 3/30; F21Y 2193/10; F21Y 2115/10
See application file for complete search history.

(56) References Cited

U.S. PATENT DOCUMENTS

| | | | |
|---|---|---|---|
| 4,859,043 A | 8/1989 | Carel | |
| 4,862,330 A | 8/1989 | Machida | |
| 5,404,869 A * | 4/1995 | Parkyn, Jr. ............. | F24S 23/31 126/699 |
| 5,477,380 A * | 12/1995 | Watanabe ............ | G03B 21/625 348/E5.137 |
| 5,617,163 A | 4/1997 | Ohtake | |
| 6,099,156 A | 8/2000 | Jenkins | |
| D723,211 S | 2/2015 | Hsu | |
| 2003/0116184 A1 | 6/2003 | Derby-Lewis | |
| 2004/0105171 A1 | 6/2004 | Minano | |

(Continued)

FOREIGN PATENT DOCUMENTS

| | | |
|---|---|---|
| CA | 2284113 A1 | 3/2000 |
| EP | 0971166 A2 | 1/2000 |

(Continued)

*Primary Examiner* — Ali Alavi
(74) *Attorney, Agent, or Firm* — Reising Ethington, P.C.

(57) ABSTRACT

An illumination device for a vehicle. The illumination device may be used to selectively illuminate a truck bed or another vehicle location or compartment. The illumination device includes a primary lens having a plurality of optical features that help target light in preferred directions. The optical features may include optical segments or optical portions having a number of optical wedges. In one embodiment, the illumination device is used in a truck bed application.

18 Claims, 8 Drawing Sheets

(56) References Cited

U.S. PATENT DOCUMENTS

| | | |
|---|---|---|
| 2004/0257790 A1 | 12/2004 | Tanaka |
| 2005/0024744 A1 | 2/2005 | Falicoff |
| 2005/0024887 A1 | 2/2005 | Boxler |
| 2005/0041307 A1 | 2/2005 | Barone |
| 2009/0086498 A1 | 4/2009 | Condon |
| 2009/0250095 A1 | 10/2009 | Thorley |
| 2010/0296265 A1 | 11/2010 | Kim |
| 2015/0345742 A1 | 12/2015 | Radl |
| 2016/0334075 A1 | 11/2016 | Nambara |

FOREIGN PATENT DOCUMENTS

| | | |
|---|---|---|
| EP | 0990579 A2 | 4/2000 |
| GB | 2509561 A | 7/2014 |
| JP | 2016001306 A | 1/2016 |
| WO | 2013056665 A1 | 4/2013 |

\* cited by examiner

ILLUMINATION DEVICE FOR A VEHICLE

FIELD

This invention generally relates to an illumination device and, more particularly, to an illumination device that may be installed on a vehicle, such as in a truck bed.

BACKGROUND

Illumination devices, particularly those used on vehicles, can be used to selectively illuminate particular functional areas. In vehicles, factors such as glare, which could impact one or more vehicle occupants, should be considered. Accordingly, directing light to selectively illuminate particular functional areas while avoiding or lessening illumination in other areas, is desirable.

SUMMARY

According to one embodiment, there is provided an illumination device for a vehicle comprising a longitudinal axis, a housing extending in the direction of the longitudinal axis, a light source assembly being mounted to the housing and including at least one light source, and a primary lens extending in the direction of the longitudinal axis. The primary lens is mounted to the housing, and includes an optical side having a plurality of optical features, the optical features including a first optical segment and a second optical segment. The first optical segment of the primary lens is located in a first axial region of the illumination device and includes a first plurality of optical wedges. The first plurality of optical wedges are located on the optical side of the primary lens and have a first plurality of wedge angles. The second optical segment of the primary lens is located in a second axial region of the illumination device and includes a second plurality of optical wedges. The second plurality of optical wedges are located on the optical side of the primary lens and have a second plurality of wedge angles. At least some of the first plurality of wedge angles in the first optical segment are the same as at least some of the second plurality of wedge angles in the second optical segment.

In accordance with another embodiment, there is provided an illumination device for a vehicle comprising a longitudinal axis, a housing extending in the direction of the longitudinal axis, a light source assembly being mounted to the housing and including at least one light source, and a primary lens extending in the direction of the longitudinal axis. The primary lens is mounted to the housing, and includes an optical side having a plurality of optical features, the optical features including a center optical portion and a side optical portion. The center optical portion extends along the longitudinal axis and the side optical portion extends parallel to the longitudinal axis alongside of the center optical portion. Each of the center optical portion and the side optical portion have a plurality of optical wedges that extend through the center optical portion and the side optical portion, each optical wedge having a wedge angle, and the wedge angle of each optical wedge is different at the side optical portion than at the center optical portion.

In accordance with another embodiment, there is provided an illumination device for a truck bed comprising a longitudinal axis, a housing extending in the direction of the longitudinal axis, a light source assembly being mounted to the housing and including at least one light source, a primary lens extending in the direction of the longitudinal axis, and a secondary lens. The primary lens is mounted to the housing, and includes an optical side having a plurality of optical features, the optical features including a plurality of optical wedges, each optical wedge having a wedge angle. The primary lens is located between the light source assembly and the primary lens. The primary lens is configured to direct light from the at least one light source to a cargo portion and an extended loading portion of the truck bed.

DRAWINGS

Preferred exemplary embodiments of the invention will hereinafter be described in conjunction with the appended drawings, wherein like designations denote like elements, and wherein.

DESCRIPTION

The illumination device described herein includes a lens with an optical surface that can provide for targeted illumination in vehicles. The illumination device may advantageously be used in vehicles such as trucks to selectively illuminate the truck bed. Given the utilitarian nature and oftentimes large area of truck beds, it may be particularly useful to illuminate multiple areas of the truck bed with a fewer number of illumination devices. The illumination devices described herein can illuminate both a cargo portion and an extended loading portion of a truck bed formed when the tailgate is lowered. While the example illumination device depicted is discussed with respect to a truck bed application, other applications for the illumination device are certainly possible, including but not limited to household or outdoor lamps or other vehicle-based applications in passenger cars, sports utility vehicles (SUVs), vans, etc. In one embodiment, the illumination device may be used in a desk lamp to illuminate the desk and the surrounding environment while minimizing the amount of light being directed toward the ceiling or a person's eyes.

Figure 1:
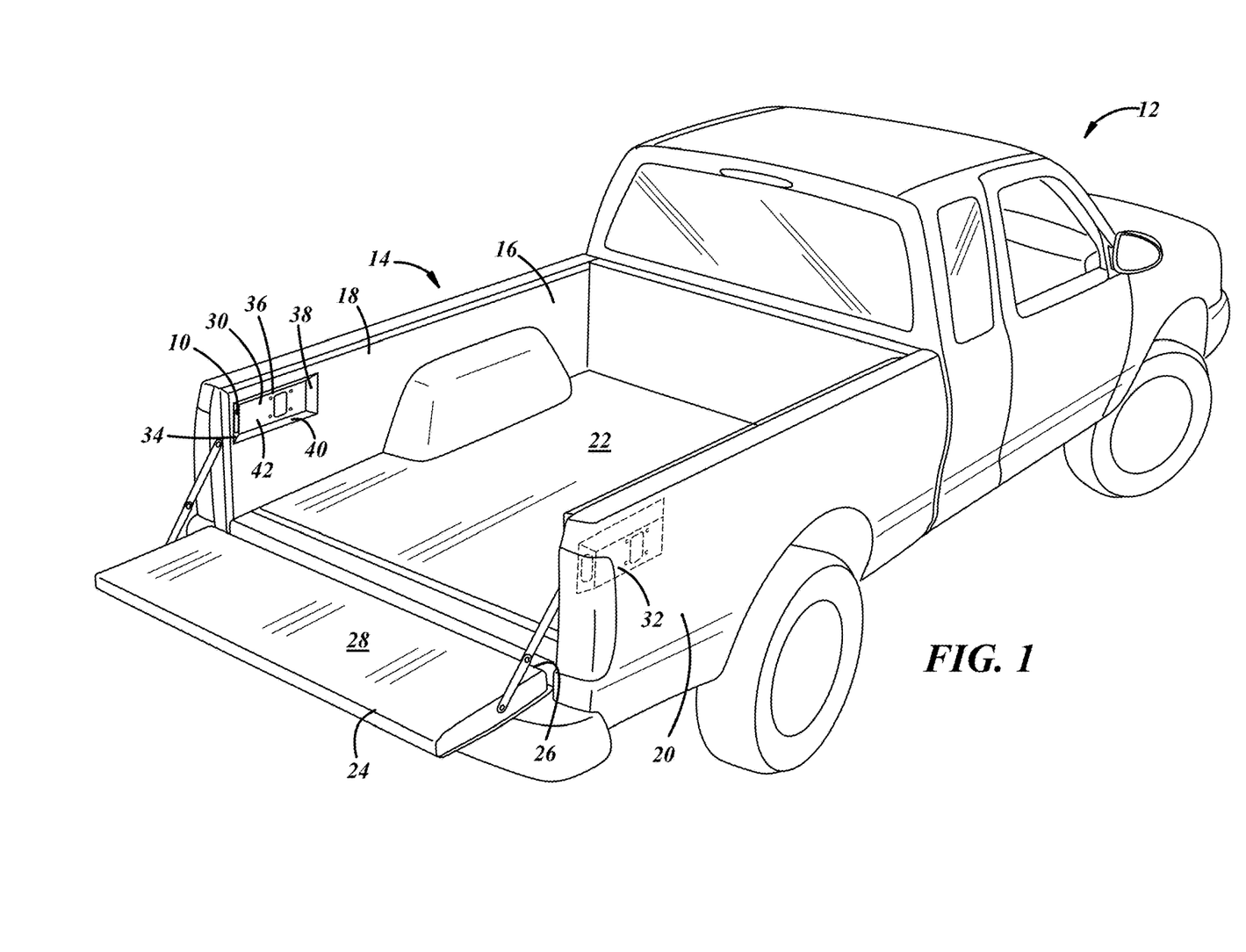
FIG. 1 is a perspective view of a truck and an illumination device in accordance with one embodiment.

FIG. 1 illustrates an illumination device 10 for a vehicle 12, which is a truck in this particular implementation. The truck 12 includes a truck bed 14 having a cargo portion 16. The cargo portion 16 is generally defined by sidewalls 18, 20, a cargo surface 22, and a tailgate 24. The tailgate 24 includes a hinged bottom 26 which may allow for lowering of the tailgate and formation of an extending loading portion 28. In the illustrated embodiment, the illumination device 10 is mounted to the sidewall 18 of the truck bed 14. A second illumination device may be included (which is not directly visible in the perspective view of FIG. 1) on the second sidewall 20.

Figure 2:
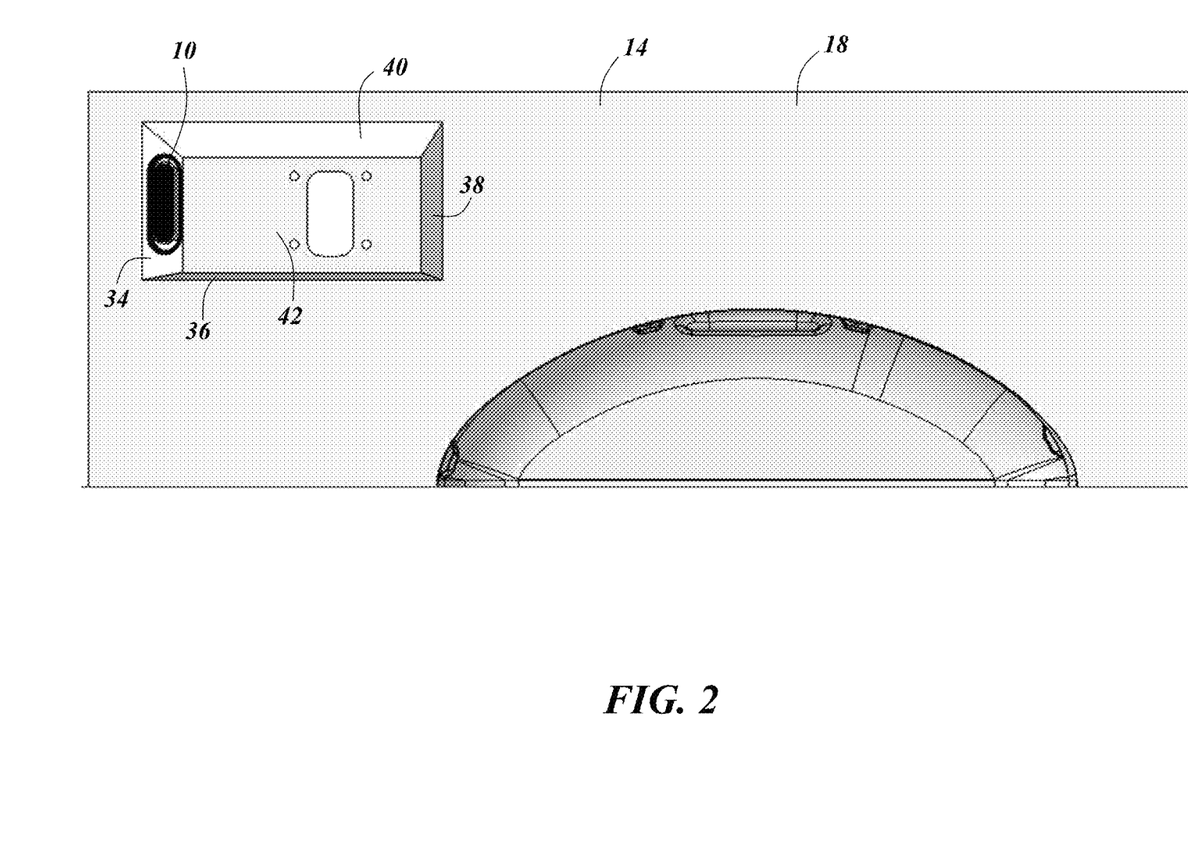
FIG. 2. is an enlarged view of the illumination device and a sidewall of the truck bed of FIG. 1.

The illumination devices 10 are located in accessory mounting regions 30, 32, on each respective sidewall 18, 20 of the truck bed 14. However, it is possible to locate one or more illumination devices on any operable surface, as a separate mounting region, compartment, recess, etc. is not necessary. Inclusion of an accessory mounting region 30, 32 may be useful in implementations where a particular mounting angle is desired, such as when selectively illuminating certain areas. An enlarged view of the accessory mounting region 30 is shown in FIG. 2. In this particular embodiment, one or more inclined sidewalls 34, 36, 38, 40 generally surround a recessed panel 42. The illumination device 10 is mounted on the inclined sidewall 34, and accordingly, is angled more toward the center of the cargo surface 22. As will be discussed in further detail, the illumination device 10 has a number of optical features, besides its mounting orientation on the accessory mounting region 30, that further help to selectively illuminate areas of the cargo portion 16 and the extended loading portion 28 of the truck bed 14. Further, it may be possible to include more illumination devices 10 than what is depicted in FIGS. 1 and 2. For example, each sidewall 18, 20 of the truck bed 14 may have a number of illumination devices, each one having a different or similar mounting orientation, depending on the desired lighting scheme. It should further be noted that the illumination device 10 may be mounted in a different orientation (e.g., such that the longitudinal axis A is perpendicular to the illustrated orientation).

Figure 3:
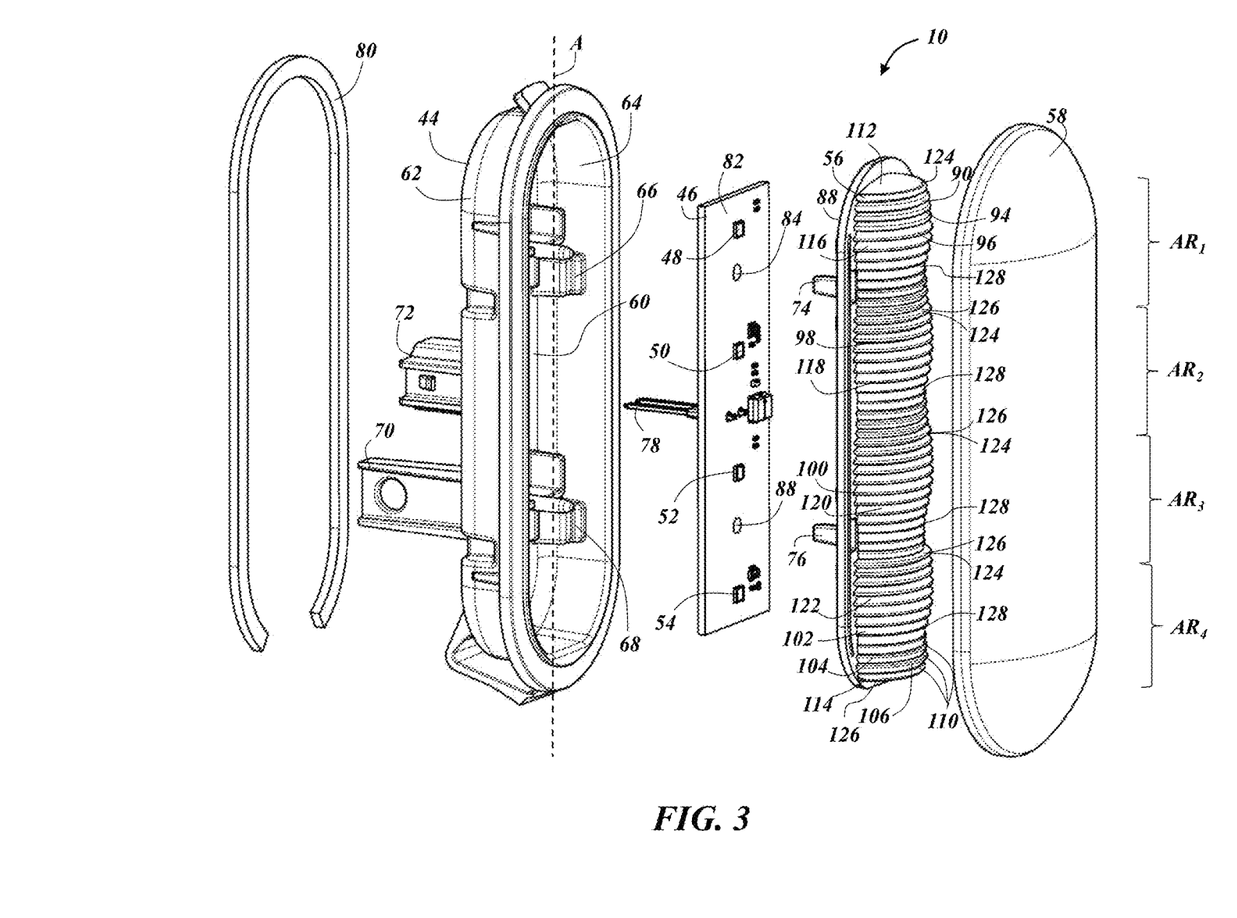
FIG. 3 is an exploded view of the illumination device of FIGS. 1 and 2.

FIG. 3 is an exploded view of the illuminating device 10 shown in FIGS. 1 and 2. The illuminating device 10 includes a housing 44 which generally extends in the direction of a longitudinal axis A. The illuminating device also includes a light source assembly 46 which is mounted to the housing 44 and includes one or more light sources 48, 50, 52, 54. The illuminating device further includes a primary lens 56 and a secondary lens 58, although it is possible to only include just the primary lens 56 or include an additional lens or lenses beyond what is shown. The secondary lens 58 in this embodiment does not have any optical features, although it could, and it helps to provide protection to the primary lens 56 from dust, debris, elemental wear, etc.

Housing 44 of the illumination device 10 can be an elongated housing that extends in the direction of the longitudinal axis A, and may be adapted based on the shape of the primary lens 56 or other design or operational considerations. In some embodiments, the housing may be integral with the installation fixture (i.e., no separate or distinct housing is mounted on the installation fixture such that the light source assembly and one or more lenses are mounted directly on the installation fixture). In the illustrated embodiment, the housing 44 includes a bottom wall 60 and a side wall 62 connected to the bottom wall. While one side wall 62 is shown, it is possible to have more than one side wall, depending on the implementation. The bottom wall 60 and the side wall 62 are configured to define an interior cavity 64 that receives the light source assembly 46. The housing includes a number of mounting flanges 66, 68, 70, 72. The mounting flanges 66, 68 are configured to meet with corresponding mounting flanges 74, 76 on the primary lens 56. Mounting flanges 70, 72 are configured to mate with or otherwise attach to the installation fixture, such as the truck bed 14, or more particularly, the accessory mounting region 30 as shown in FIGS. 1 and 2. Mounting flange 72 may accommodate the terminals 78 of the light source assembly 46. It should be understood, however, that the configurations, forms, etc. of the respective mounting flanges may be changed or altered depending on the application or structure of the illumination device 10. Additionally, one or more gaskets 80 may be included to help seal or otherwise attach the housing to the installation fixture.

Light source assembly 46 of the illumination device 10, like the housing 44, extends in the direction of the longitudinal axis A in the illustrated embodiment. The light source assembly may include a printed circuit board (PCB) 82 which is adapted to receive light sources 48, 50, 52, 54 and the terminals 78. The light sources 48, 50, 52, 54 in this embodiment are surface mounted light emitting diodes (LEDs), although any operable type or form of light source is certainly possible. In a specific embodiment, the light intensity is about 160 lumens total (about 40 lumens per LED). The light sources 48, 50, 52, 54 in the illustrated embodiment are spaced such that there is one light source in each of four axial regions $AR_1$, $AR_2$, $AR_3$, $AR_4$. Thus, as shown, the first light source 48 is located in the first axial region $AR_1$, the second light source 50 is located in the second axial region $AR_2$, the third light source 52 is located in the third axial region $AR_3$, and the fourth light source 54 is located in the fourth axial region $AR_4$. It is possible for the illumination device to be divided up into any number of axial regions $AR_n$, with a corresponding light source located in each axial region $AR_{1,2\ldots n}$. The light source assembly 46 may also include features to help facilitate attachment of various components of the illumination device 10, such as openings 84, 86 which allow the mating of mounting flanges 66, 68 of the housing 44 with the mounting flanges 74, 76, respectively, of the primary lens 56. The light source assembly 46 may also be joined directly to the housing 44, such as via a heat staking process or the like.

Figure 4:
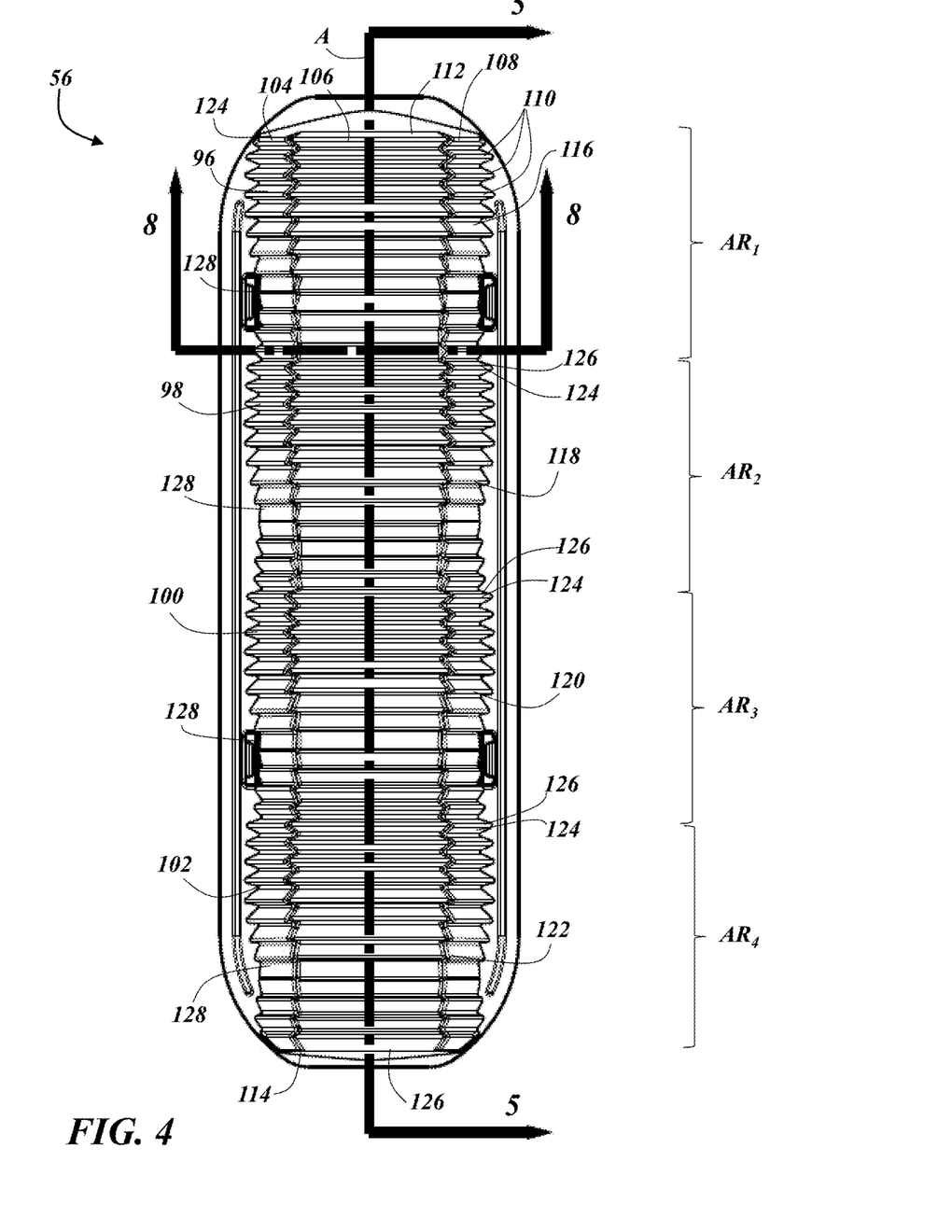
FIG. 4 is a front view of the primary lens of the illumination device of FIGS. 1-3.
Figure 5:
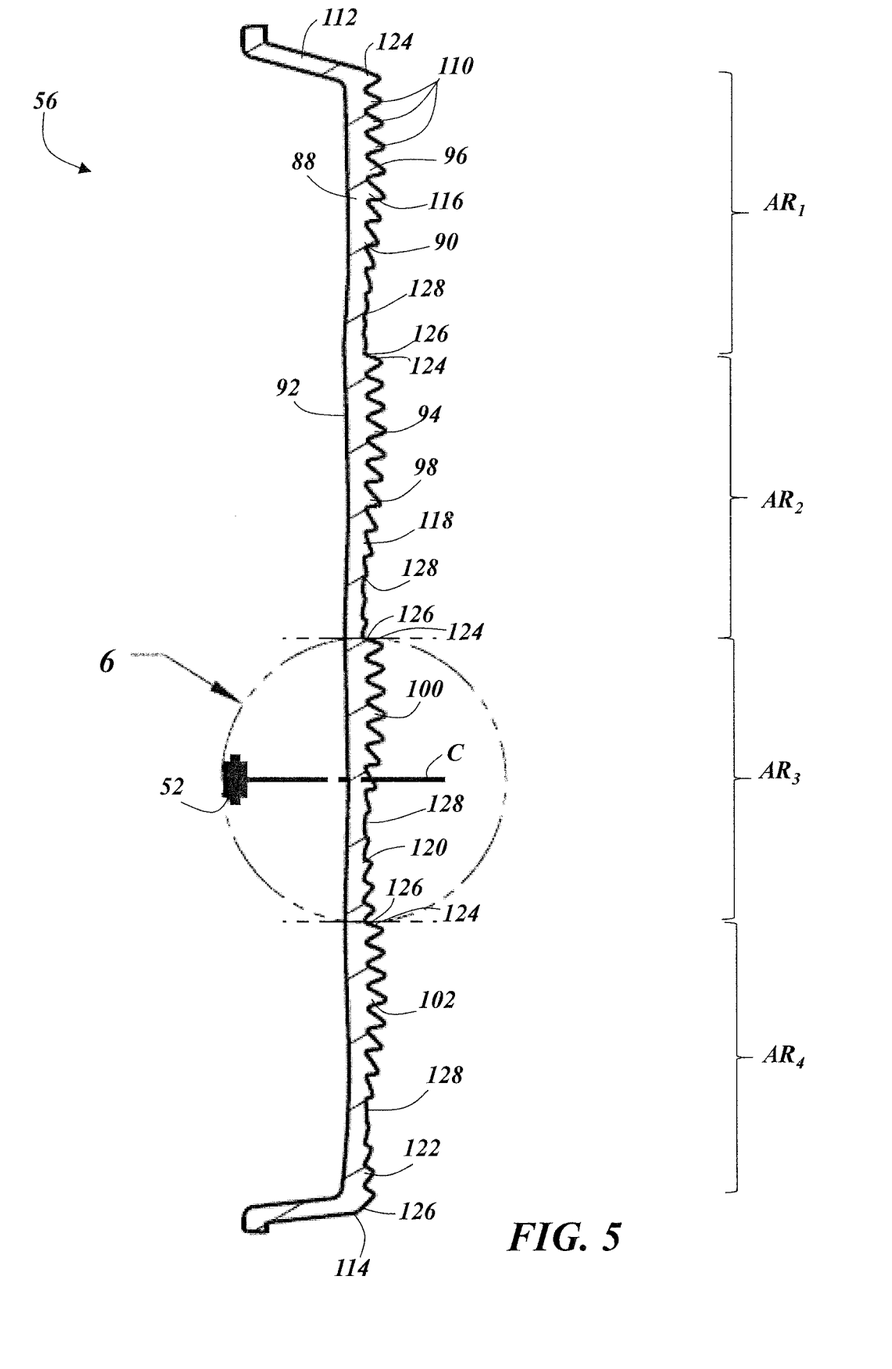
FIG. 5 is a cross-sectional view of the primary lens of the illumination device of FIGS. 1-4 taken along line 5-5 of FIG. 4.
Figure 6:
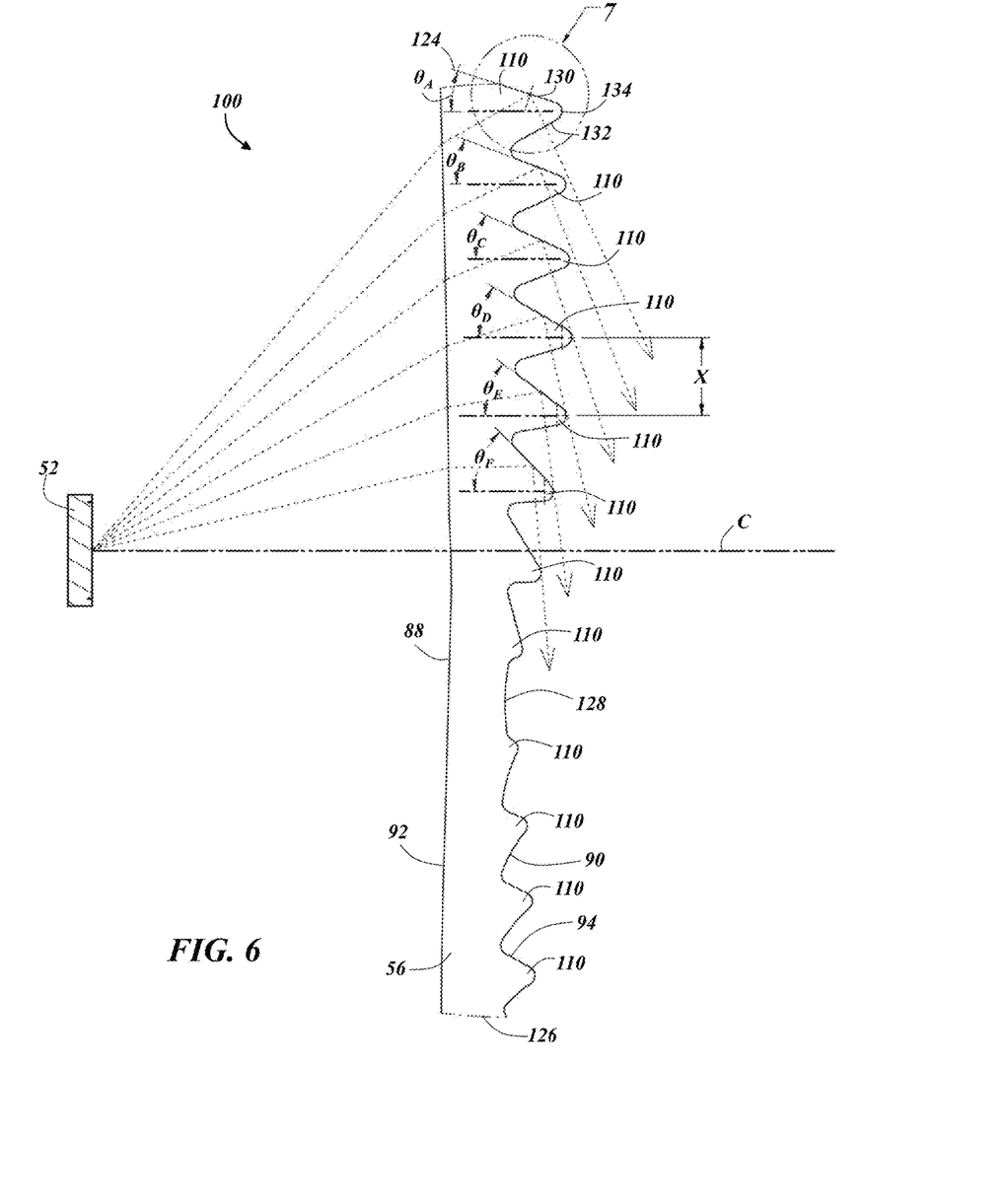
FIG. 6 is a partial, cross-sectional view of the primary lens of the illumination device of FIGS. 1-5.
Figure 7:
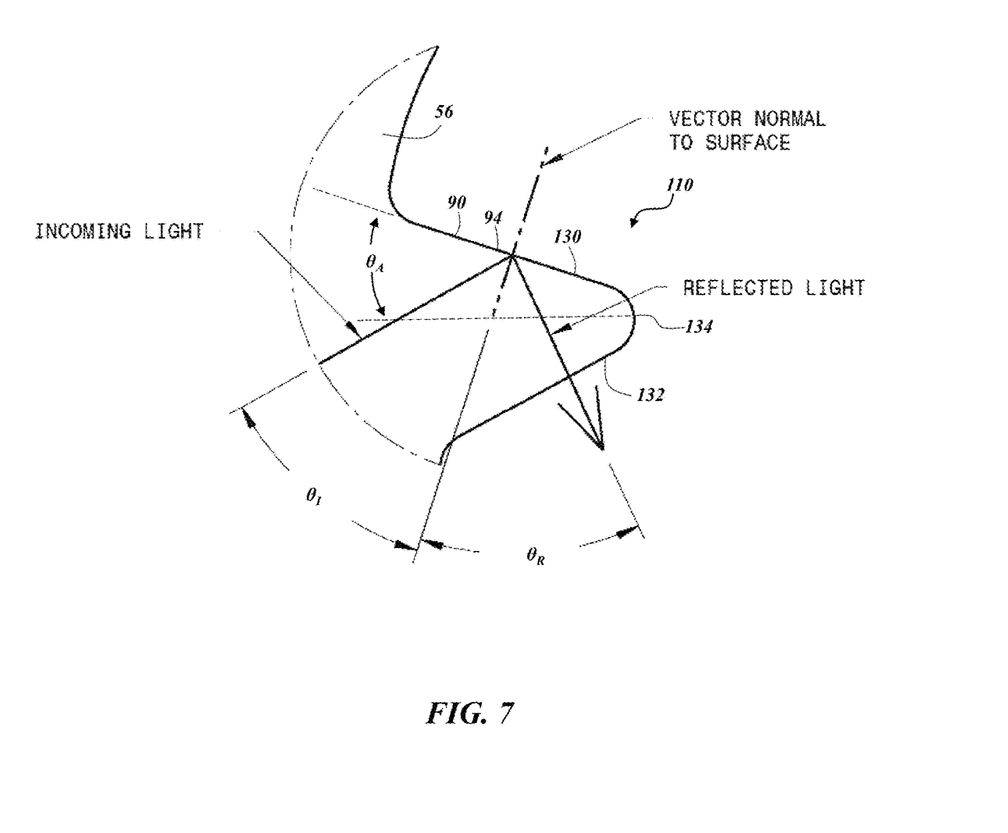
FIG. 7 is an enlarged, cross-sectional view of an optical wedge of the illumination device of FIGS. 1-6.
Figure 8:
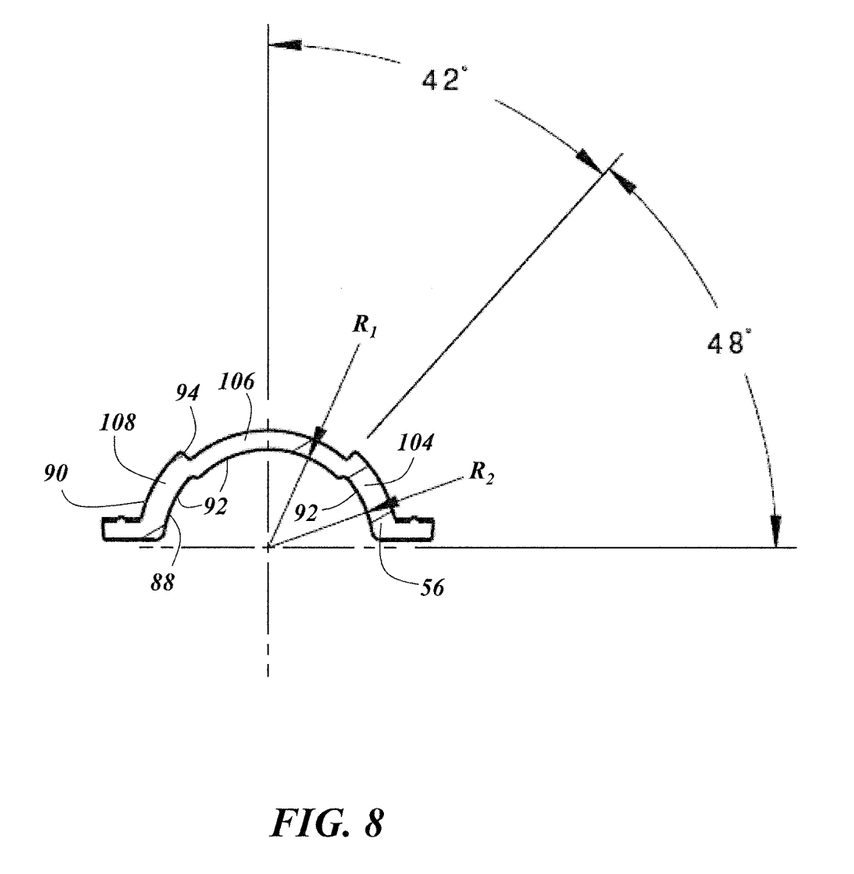
FIG. 8 is a cross-sectional view of the primary lens of the illumination device of FIGS. 1-7 taken along line 8-8 of FIG. 4.

Primary lens 56 of the illumination device 10, as shown in FIGS. 3-8, can have a structure designed at least in part to direct light from the one or more light sources 48-54 to one or more desired areas. FIG. 4 shows a front view of primary lens 56. FIG. 5 is a cross-sectional view of the primary lens 56, taken along line 5-5 in FIG. 4. FIGS. 6 and 7 are enlarged portions of the cross-sectional view of the primary lens 56, and FIG. 8 is a cross-sectional view of the primary lens 56 taken along line 8-8 in FIG. 4. Primary lens 56 includes an inner side 88 and an outer side 90. In this embodiment, the inner side includes one or more smooth lens surfaces 92 and the outer side is a jagged lens surface 94. Primary lens 56 includes a number of optical features on an optical side thereof. In this embodiment, the outer side 90 is the optical side, and accordingly the optical features are shown on the outer side 90 of the primary lens, but one or more optical features may alternatively or additionally be included on the inner side 88 such that the inner side is an optical side. Having the optical side be the outer side 90 which includes the optical features may help maximize the light refraction. The optical features may include optical segments 96, 98, 100, 102 and/or optical portions 104, 106, 108. As will be detailed further below, the optical segments 96, 98, 100, 102 generally span the radial or horizontal extent of the primary lens 56 such that they are sort of stacked along the longitudinal axis A, or may be considered aligned in the direction of the longitudinal axis A. The optical portions 104, 106, 108, on the other hand, generally span the axial or vertical extent of the primary lens 56 such that they extend along or parallel to the longitudinal axis A.

One or more of the optical segments 96, 98, 100, 102 and/or the optical portions 104, 106, 108 may include a plurality of optical wedges 110. In the figures, not all of the optical wedges 110 are labeled for clarity purposes, but it should be understood that in the illustrated embodiment, the plurality of optical wedges 110 generally span the axial or vertical length of the primary lens 56 from a first axial end 112 to a second axial end 114, with each optical wedge 110 spanning across the first side optical portion 104, the center optical portion 106, and the second side optical portion 108. Upon illumination of one or more of the light sources 48, 50, 52, 54, the optical wedges 110 may provide a jeweled appearance and can more than double the amount of light directed toward the cargo portion 16 and the extended loading portion 28 when the illumination device 10 is installed in a truck bed 14 as shown in FIGS. 1 and 2.

The first optical segment 96 of the primary lens 56 includes a first plurality of optical wedges 110. The first optical segment 96 is located toward the first axial end 112 in the first axial region $AR_1$. The second optical segment 98 is located next to the first optical segment 96 and includes a second plurality of optical wedges 110. The second optical segment 98 is located in the second axial region $AR_2$. The third optical segment 100 is located next to the second optical segment 98 and includes a third plurality of optical wedges 110. The third optical segment 100 is located in the third axial region $AR_3$. The fourth optical segment 102 is located next to the third optical segment 104 and includes a fourth plurality of optical wedges 110. The fourth optical segment 102 is located in the fourth axial region $AR_4$ toward the second axial end 114. In the illustrated embodiment, the first plurality of optical wedges 110 in the first optical segment 96 have the same configuration as the second plurality of optical wedges 110 in the second optical segment 98. Also, the third plurality of optical wedges 110 in the third optical segment 100 have the same configuration as the fourth plurality of optical wedges 110 in the fourth optical segment 102. As will be detailed more fully below, each optical wedge 110 has a wedge angle θ. Accordingly, some of the first plurality of wedge angles in the first optical segment 96 are the same as at least some of the second plurality of wedge angles in the second optical segment 98, and some of the third plurality of wedge angles in the third optical segment 100 are the same as at least some of the fourth plurality of wedge angles in the fourth optical segment 102.

One or more of the optical segments 96, 98, 100, 102 may at least partially resemble a Fresnel lens such that the optical wedges 110 are part of corresponding concentric ring sections 116, 118, 120, 122. The Fresnel-like construction can help prevent loss, as the concentric ring sections 116, 118, 120, 122 can help bend light downwards that normally would go up but for the configuration of the optical wedges 110. The primary lens 56 may exhibit half cylindrical symmetry, which can further effectuate bending of light from the light sources 48, 50, 52, 54. However, the primary lens 56 could have other shapes in other embodiments.

Each of the optical segments 96, 98, 100, 102 include a first optical segment end 124, a second optical segment end 126, and an optical segment transition point 128 between the first optical segment end and the second optical segment end. These points 124, 126, 128 can be more clearly seen in the cross-section view of FIG. 5 and the enlarged view of the third optical segment 100 shown in FIG. 6. For clarity purposes, only one light source 52 is shown in FIG. 5, although each of the optical segments 96, 98, 100, 102 have a corresponding light source 48, 50, 52, 54. With particular reference to FIG. 6, the light source 52 is located along a center line C between the first optical segment end 124 and the second optical segment end 126. The transition point 128 is located between the center line C and the second optical segment end 126.

FIGS. 6 and 7, simulated and simplified light distribution is shown for the optical wedges 110 located between the first optical segment end 124 and the center line C. When light from the light source 52 strikes the inner side 88 at the smooth lens surface 92, the light is refracted toward normal. FIG. 7 shows an enlarged view of the first optical wedge 110, which illustrates that as light passes through the primary lens 56, it strikes a reflection surface 130 of the optical wedge 110. Accordingly, with relation to a vector normal to the surface of the reflection surface 130, an incident angle $θ_I$ is approximately equal to a reflection angle $θ_R$. In this embodiment, given the particular wedge angle $θ_A$, which will be detailed further below, and is about 18° or more particularly, 17.86°, results in an incident angle $θ_I$ of about 42.8° and a reflection angle $θ_R$ of about 42.8°. Light from the light source 52 passes through a refraction surface 132 and is directed downward toward center line C. It should be noted that for clarity purposes, the reflection surface 130 and the refraction surface 132 and an apex 134 therebetween are labeled in the enlarged view of the optical wedge 110 of FIG. 7 and accordingly in the same optical wedge 110 shown in FIG. 6. For optical wedges 110 above the center line C, the reflection surface 130 and the refraction surface 132 will be consistent with the first optical wedge 110. Typically, although not necessarily, the reflection surface 130 is the surface of the optical wedge 110 that is closest the optical segment end 124 and the refraction surface 132 is the surface of the optical wedge 110 that is closest to the optical segment transition point 128. For optical wedges 110 below the center line C, and more particularly, for optical wedges 110 below the optical segment transition point 128, refraction is the primary mechanism for directing the light. Below the optical segment transition point 128, it is not as easy for direct rays from the light source 52 to hit the optical wedges 110, and accordingly, the surfaces of the of the optical wedges 110 between the optical segment transition point and the optical segment end 126 are usually at least partly in shadow.

Each optical wedge 110 has a wedge angle, $θ_A$-$θ_F$, shown as examples in FIG. 6. The other optical wedges 110 also have wedge angles, each wedge angle being generally defined as the angle between the reflection surface 130 and a line parallel to the center line C at the apex 134 of each wedge 110. An enlarged view of the wedge angle $θ_A$ is shown in FIG. 7. In the illustrated embodiment, the wedge angles $θ_A$-$θ_F$ increase from the optical segment ends 124, 126 toward the optical segment transition point 128. Accordingly, $θ_A$ is smaller than $θ_B$, $θ_B$ is smaller than $θ_C$, $θ_C$ is smaller than $θ_D$, $θ_D$ is smaller than $θ_E$, and $θ_E$ is smaller than $θ_F$. In one embodiment the wedge angle distribution goes from a minimum of about 15° to a maximum of about 85° (i.e., the wedge angle closest to the either of the first or second optical segment ends 124, 126 is about 15° and the wedge angle closest to the optical segment transition point 128 is about) 85°. In the illustrated embodiment, $θ_A$ is 17.86°, $θ_B$ is 20.81°, $θ_C$ is 24.55°, $θ_D$ is 29.64°, $θ_E$ is 36.52°, and $θ_F$ is 46.02°. In this embodiment, each wedge angle is not consistently increased but instead is gradually increased by a larger factor the closer the angle is to the optical segment transition point 128 (i.e., with $θ_A$ of n, $θ_B$=n+ $θ_C$=$θ_B$+$θ_D$=$θ_C$+~5°, $θ_E$=$θ_D$+~7°, and $θ_F$=$θ_E$+~10°, or alternatively [n, n+~3°, n+~7°, n+~12°, n+~19°, n+~29°]). Other distributions or values for each wedge angle are certainly possible.

The optical wedges 110 may have a consistent spacing between them, as measured from each apex 134 or another consistent point at each wedge. FIG. 6 shows this spacing X. Alternatively, the optical wedges 110 may not be consistently spaced along the optical side or outer side 90. Additionally, each optical wedge 110 may have a consistent height (i.e., the spacing from the inner side 88 to the outer side 90 at the apex 134 of each wedge). Or, the optical wedges 110 may have variable heights. In one embodiment, the height is greater toward each optical segment end 124, 126 than at the optical segment transition point 128.

Returning to FIG. 5, it can be seen that the optical wedges 110 in the first optical segment 96 are the same as the optical wedges in the second optical segment 98 such that at least some of the plurality of wedge angles in the first optical segment are the same as at least some of the plurality of wedge angles in the second optical segment, or even more particularly, all of the wedge angles in the first optical segment are the same as the wedge angles in the second optical segment. Similarly, the optical wedges 110 in the third optical segment 100 are the same as the optical wedges in the fourth optical segment 102 such that at least some of the plurality of wedge angles in the third optical segment are the same as at least some of the plurality of wedge angles in the fourth optical segment, or even more particularly, all of the wedge angles in the third optical segment are the same as the wedge angles in the fourth optical segment. Accordingly, the optical side or outer side 90 may have a plurality of repeating optical segments 96, 98, 100, 102. In the illustrated embodiment, the optical segments 96, 98 on the top half of the primary lens 56 have the same configuration of optical wedges 110, and the optical segments 100, 102 on the bottom half of the primary lens 56 have the same configuration of optical wedges 110. Other configurations are certainly possible.

Optical features on the primary lens 56 may also include a number of optical portions 104, 106, 108 which are shown in FIGS. 4 and 8. The optical portions in the illustrated embodiment include a side optical portion 104, a center optical portion 106, and another side optical portion 108. The center optical portion 106 extends along the longitudinal axis A and each side optical portion 104, 108 extend parallel to the longitudinal axis A alongside the center optical portion. As can be seen in FIG. 4, each optical wedge 110 extends through the center optical portion 106 and each side optical portion 104, 108. In one embodiment, the wedge angle θ of each optical wedge 110 is different at one or both side optical portions 104, 108 than at the center optical portion 106. In a more particular embodiment, the wedge angle θ is the same at each optical portion 104, 108. Including a different wedge angle θ at one or more of the side portions 104, 108 may allow for more targeted light distribution. For example, the wedge angle θ at each side portion may be altered or adapted to distribute more light at one or more functional areas, such as the extended loading portion 28 of the tailgate 24 of a truck bed 14 as shown in FIG. 1. Further, including different wedge angles θ at one or more side optical portions 104, 108 may improve manufacturing, as it can improve mold flow turbulence.

With particular reference to FIG. 8, it can be seen that the center optical portion 106 and the side optical portions 104, 108 are concentric and exhibit half cylindrical symmetry. It is possible to have a differently shaped primary lens 56, such as one that is more planar on its inner side 88, but the hemispheric shape may be more efficient at bending light in a smooth distribution. Further, in the illustrated embodiment, the hemispheric radius $R_1$ at the center optical portion 106 is less than the hemispheric radius $R_2$ at either side optical portion 104, 108. When the primary lens 56 is shaped as illustrated, the side optical portions 104, 108 may each span about 45°-50° such that the side optical portions together span about 90°-100° and the center optical portion spans about 80°-90°. In the illustrated embodiment, each side optical portion 104, 108 spans about 48° and the center optical portion spans about 84°. The perspective of FIG. 8 also shows that it is possible for each optical portion 104, 106, 108 to have its own smooth inner lens surface 92.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An illumination device for a vehicle, comprising:
   a longitudinal axis;
   a housing extending in the direction of the longitudinal axis;
   a light source assembly being mounted to or within the housing and including at least one light source, wherein the light source assembly includes a circuit board, a first light emitting diode (LED) connected to the circuit board, and a second light emitting diode (LED) connected to the circuit board; and
   a primary lens extending in the direction of the longitudinal axis, being mounted to or within the housing, and including an optical side having a plurality of optical features, the optical features including a first optical segment and a second optical segment, wherein the primary lens includes an inner side and an outer side, the inner side being closer to the light source assembly than the outer side, and wherein the outer side is the optical side;
   the first optical segment of the primary lens is located in a first axial region of the illumination device and includes a first plurality of optical wedges, the first plurality of optical wedges are located on the optical side of the primary lens and have a first plurality of wedge angles; and
   the second optical segment of the primary lens is located in a second axial region of the illumination device and includes a second plurality of optical wedges, the second plurality of optical wedges are located on the optical side of the primary lens and have a second plurality of wedge angles, wherein at least some of the first plurality of wedge angles in the first optical segment are the same as at least some of the second plurality of wedge angles in the second optical segment, wherein the first LED is located in the first axial region of the illumination device and emits light that strikes the inner side at the first optical segment and the second LED is located in the second axial region of the illumination device and emits light that strikes the inner side at the second optical segment.

2. The illumination device of claim 1, wherein the housing is an elongated housing that extends in the direction of the longitudinal axis and includes a bottom wall, a side wall connected to the bottom wall, and a mounting flange connected to the bottom wall, the bottom and side walls are configured to define an interior cavity that receives the light source assembly and the mounting flange is configured to mate with a corresponding mounting flange on the primary lens.

3. The illumination device of claim 1, wherein the primary lens is a convex lens that curves away from the light source assembly, the inner side of the primary lens includes a smooth lens surface and the outer side of the primary lens includes a jagged lens surface.

4. The illumination device of claim 1, wherein the primary lens is an elongated lens and includes at least four optical segments aligned in the direction of the longitudinal axis, the first optical segment is located at a first axial end of the primary lens, the second optical segment is located next to the first optical segment, a third optical segment is located next to the second optical segment, and a fourth optical segment is located next to the third optical segment at a second axial end of the primary lens.

5. The illumination device of claim 1, further comprising a secondary lens, wherein the primary lens is located between the light source assembly and the secondary lens.

6. The illumination device of claim 1, wherein the plurality of optical features includes a center optical portion and a side optical portion, wherein the center optical portion extends along the longitudinal axis and the side optical portion extends parallel to the longitudinal axis alongside the center optical portion.

7. The illumination device of claim 6, wherein each optical wedge extends through the center optical portion and the side optical portion and the wedge angle of each optical wedge is different at the side optical portion than at the center optical portion.

8. The illumination device of claim 6, wherein the center optical portion and the side optical portion are concentric and a hemispheric radius of the primary lens is greater at the side optical portion than at the center optical portion.

9. The illumination device of claim 6, further comprising a second side optical portion, wherein the center optical portion is located between the first and second side optical portions, and the primary lens exhibits half cylindrical symmetry.

10. An illumination device for a vehicle, comprising:
a longitudinal axis;
a housing extending in the direction of the longitudinal axis;
a light source assembly being mounted to or within the housing and including at least one light source; and
a primary lens extending in the direction of the longitudinal axis, being mounted to or within the housing, and including an optical side having a plurality of optical features, the optical features including a first optical segment and a second optical segment;

the first optical segment of the primary lens is located in a first axial region of the illumination device and includes a first plurality of optical wedges, the first plurality of optical wedges are located on the optical side of the primary lens and have a first plurality of wedge angles; and the second optical segment of the primary lens is located in a second axial region of the illumination device and includes a second plurality of optical wedges, the second plurality of optical wedges are located on the optical side of the primary lens and have a second plurality of wedge angles, wherein at least some of the first plurality of wedge angles in the first optical segment are the same as at least some of the second plurality of wedge angles in the second optical segment, wherein the first optical segment at least partially resembles a Fresnel lens such that the first plurality of optical wedges are part of a first plurality of concentric ring sections and the first plurality of wedge angles vary such that adjacent optical wedges have different wedge angles, and the second optical segment also resembles a Fresnel lens such that the second plurality of optical wedges are part of a second plurality of concentric ring sections and the second plurality of wedge angles vary such that adjacent optical wedges have different wedge angles.

11. An illumination device for a vehicle, comprising:
a longitudinal axis;
a housing extending in the direction of the longitudinal axis;
a light source assembly being mounted to or within the housing and including at least one light source; and
a primary lens extending in the direction of the longitudinal axis, being mounted to or within the housing, and including an optical side having a plurality of optical features, the optical features including a first optical segment and a second optical segment;

the first optical segment of the primary lens is located in a first axial region of the illumination device and includes a first plurality of optical wedges, the first plurality of optical wedges are located on the optical side of the primary lens and have a first plurality of wedge angles; and the second optical segment of the primary lens is located in a second axial region of the illumination device and includes a second plurality of optical wedges, the second plurality of optical wedges are located on the optical side of the primary lens and have a second plurality of wedge angles, wherein at least some of the first plurality of wedge angles in the first optical segment are the same as at least some of the second plurality of wedge angles in the second optical segment;

wherein each optical segment has a first optical segment end and a second optical segment end and an optical segment transition point between the first optical segment end and the second optical segment end, wherein the wedge angles of the optical wedges toward either of the first optical segment end or the second optical segment end are smaller than the wedge angles of the optical wedges toward the optical segment transition point.

12. The illumination device of claim 11, wherein at least one light source of the one or more light sources is located along a center line between the first optical segment end and the second optical segment end and the optical segment transition point is located between the center line and the second optical segment end.

13. An illumination device for a truck bed, comprising:
a longitudinal axis;
a housing extending in the direction of the longitudinal axis;
a light source assembly being mounted to or within the housing and including at least one light source; and
a primary lens extending in the direction of the longitudinal axis, being mounted to or within the housing, and including an optical side having a plurality of optical features, the optical features including a plurality of optical wedges, each optical wedge having a wedge angle; and
a secondary lens, wherein the primary lens is located between the light source assembly and the secondary lens, wherein the primary lens is configured to direct light from the at least one light source to a cargo portion and an extended loading portion of the truck bed.

14. The illumination device of claim 13, wherein the optical features further include a first optical segment and a second optical segment, the first optical segment of the primary lens is located in a first axial region of the illumination device, and the second optical segment of the primary lens is located in a second axial region of the illumination device, wherein at least some wedge angles of the optical wedges at the first optical segment are the same as at least some of the wedge angles of the optical wedges at the second optical segment.

15. A truck bed, comprising:
a tailgate having a hinged bottom that is configured to form an extended loading portion;
a plurality of sidewalls and a cargo surface which at least partially define a cargo portion; and
an illumination device, comprising:
a longitudinal axis;
a housing extending in the direction of the longitudinal axis;
a light source assembly being mounted to or within the housing and including at least one light source; and
a primary lens extending in the direction of the longitudinal axis, being mounted to or within the housing, and including an optical side having a plurality of optical features, the optical features including a first optical segment and a second optical segment;
the first optical segment of the primary lens is located in a first axial region of the illumination device and includes a first plurality of optical wedges, the first plurality of optical wedges are located on the optical side of the primary lens and have a first plurality of wedge angles; and
the second optical segment of the primary lens is located in a second axial region of the illumination device and includes a second plurality of optical wedges, the second plurality of optical wedges are located on the optical side of the primary lens and have a second plurality of wedge angles,
wherein at least some of the first plurality of wedge angles in the first optical segment are the same as at least some of the second plurality of wedge angles in the second optical segment,
wherein the primary lens is configured to direct light from the at least one light source to the extended loading portion and the cargo portion.

16. An illumination device for a vehicle, comprising:
a longitudinal axis;
a housing extending in the direction of the longitudinal axis;
a light source assembly being mounted to or within the housing and including at least one light source;
a primary lens extending in the direction of the longitudinal axis, being mounted to or within the housing, and including an optical side having a plurality of optical features, the optical features including a center optical portion and a side optical portion, wherein the center optical portion extends along the longitudinal axis and the side optical portion extends parallel to the longitudinal axis alongside of the center optical portion, wherein each of the center optical portion and the side optical portion have a plurality of optical wedges that extend through the center optical portion and the side optical portion, each optical wedge having a wedge angle, and the wedge angle of each optical wedge is different at the side optical portion than at the center optical portion.

17. The illumination device of claim 16, further comprising a second side optical portion, wherein the center optical portion is located between the first and second side optical portions, and the primary lens exhibits half cylindrical symmetry.

18. The illumination device of claim 16, wherein the optical features further include a first optical segment and a second optical segment, the first optical segment of the primary lens is located in a first axial region of the illumination device, and the second optical segment of the primary lens is located in a second axial region of the illumination device, wherein at least some wedge angles of the optical wedges at the first optical segment are the same as at least some of the wedge angles of the optical wedges at the second optical segment.

* * * * *

UNITED STATES PATENT AND TRADEMARK OFFICE
CERTIFICATE OF CORRECTION

PATENT NO. : 10,364,961 B2
APPLICATION NO. : 15/800004
DATED : July 30, 2019
INVENTOR(S) : Todd Irgang et al.

It is certified that error appears in the above-identified patent and that said Letters Patent is hereby corrected as shown below:

In the Specification

Column 6; Line 63-64:
Replace (i.e., with θA of n, θB=n+ θC=θB+θD=θC+~5°, θE=θD+~7°, and θF=θE+~10°, or alternatively [n, n+~3°, n+~7°, n+~12°, n+~19°, n+~29°])

With:
(i.e., with θA of n, θB = n + ~3°, θC = θB + ~4°, θD = θC + ~5°, θE = θD + ~7°, and θF = θE + ~10°, or alternatively [n, n + ~3°, n + ~7°, n + ~12°, n + ~19°, n + ~29°])

Signed and Sealed this
Nineteenth Day of January, 2021

Andrei Iancu
*Director of the United States Patent and Trademark Office*